United States Patent [19]

Trautwein

[11] 4,306,967

[45] Dec. 22, 1981

[54] COOLING TOWER BASIN WATER TREATING APPARATUS

[76] Inventor: Bill B. Trautwein, 12806 Samuel La., Houston, Tex. 77015

[21] Appl. No.: 140,418

[22] Filed: Apr. 14, 1980

[51] Int. Cl.³ .................... B01D 21/24; B01D 21/26
[52] U.S. Cl. ............................ 210/167; 210/195.2; 210/196; 210/241; 210/260; 210/298; 261/DIG. 11
[58] Field of Search .............. 210/787, 788, 167, 803, 210/804–806, 241, 298, 304, 512 M, 255, 260, 261, 195.1, 196; 261/DIG. 11

[56] References Cited

U.S. PATENT DOCUMENTS

| | | | |
|---|---|---|---|
| 3,299,619 | 1/1967 | Terry | 261/DIG. 11 |
| 3,515,276 | 6/1970 | Comer et al. | 210/167 |
| 3,698,558 | 10/1972 | Weber et al. | 210/304 |
| 3,840,120 | 10/1974 | Greenberg | 210/167 |
| 3,989,628 | 11/1976 | Bier | 210/255 |
| 4,052,311 | 10/1977 | Martin | 210/298 |

FOREIGN PATENT DOCUMENTS 54-120128  9/1979  Japan ............................ 210/512 R Primary Examiner—Benoît Castel
Attorney, Agent, or Firm—Guy E. Matthews

[57] ABSTRACT

A portable cleaning apparatus for removing solids and particulate material from water in the basin of a cooling tower and having a trailer with a frame supporting a platform and a plurality of wheels for enabling said trailer to be towed from place to place, a power driven pump means mounted on said platform and having a suction side adapted to be placed into communication with water contaminated with solids in the basin of a cooling tower, a filter device arranged on said platform and including a filter medium therein, an inlet for liquid influent connected to the pump outlet and an effluent outlet downstream of the filter medium, the filter medium being so constructed and arranged as to retain solid particles thereon whose diameter is in excess of 0.375 inches, a bank of a plurality of hydrocyclone separators located on said platform and including a feed header in communication with the feed inlet of each hydrocyclone, an outlet header being connected to the overflow discharge of each hydrocyclone, said filter effluent outlet being connected to said feed header, and said outlet header recirculating clarified effluent back to the basin of said cooling tower, a sediment solids tank arranged on said platform and with said filter device having a solids discharge outlet in communication with said tank, each of said hydrocyclones including underflow discharge means in communication with said tank, and auger means having an inlet located within said tank and an outlet adapted to discharge solids outside said tank.

12 Claims, 8 Drawing Figures

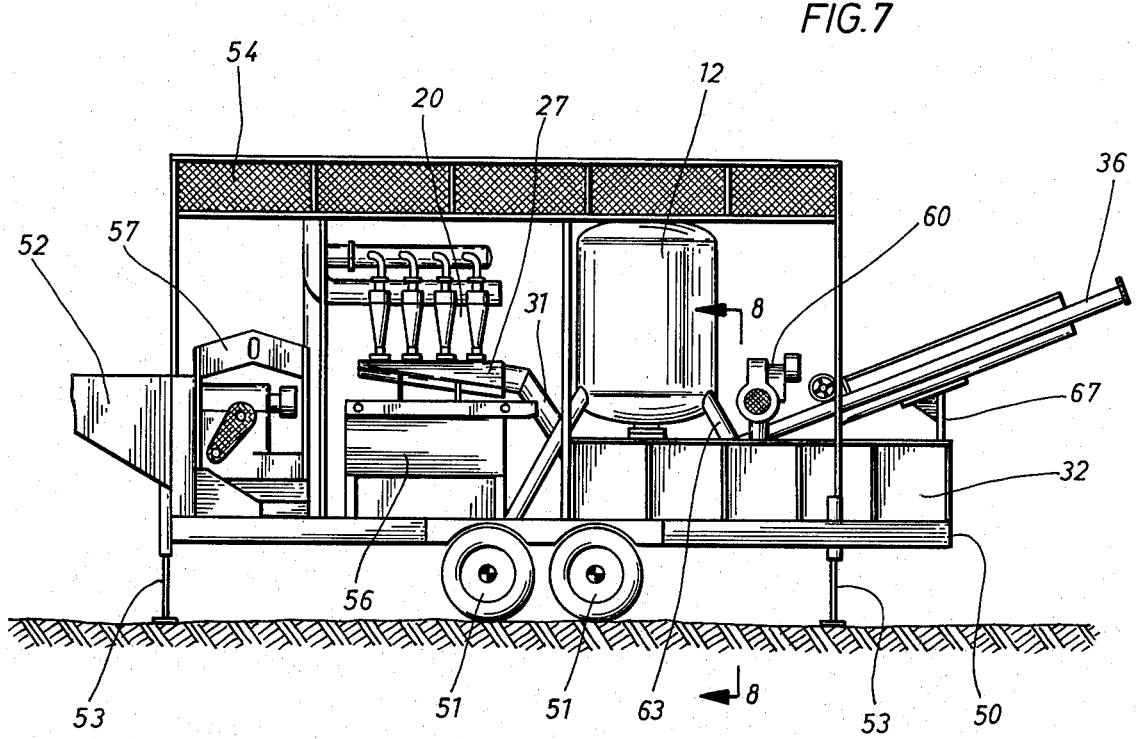
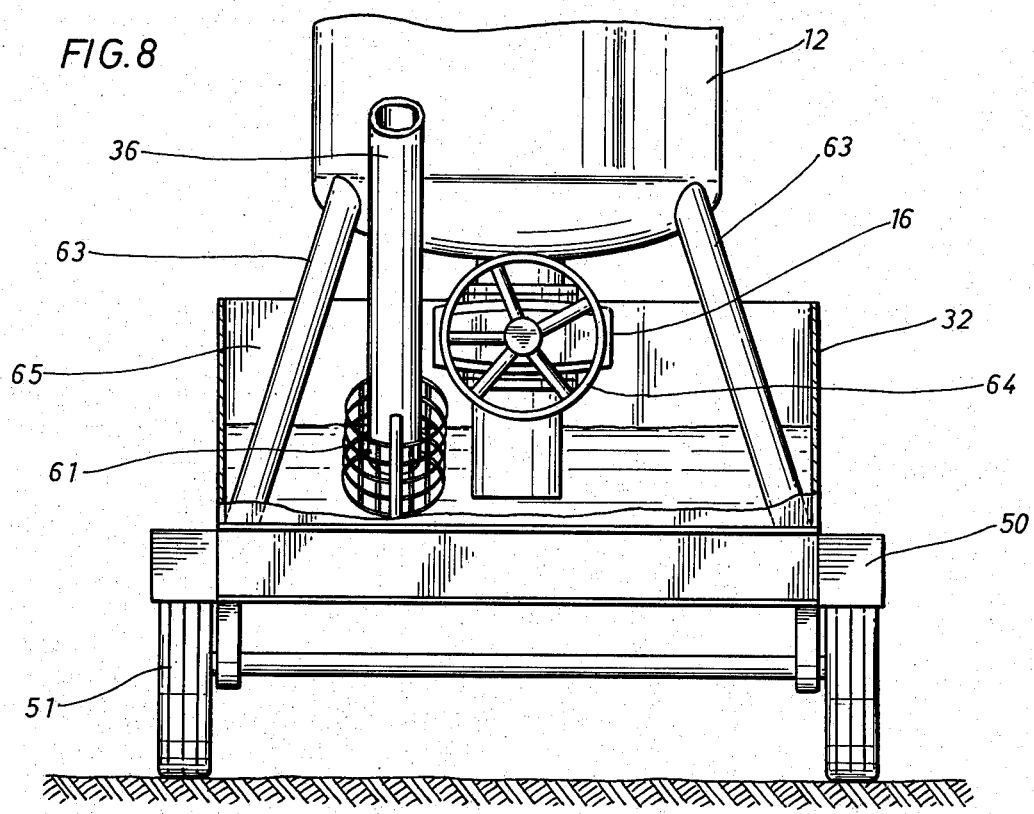

COOLING TOWER BASIN WATER TREATING APPARATUS

BACKGROUND OF THE INVENTION

This invention relates to a portable water treatment apparatus and more particularly relates to a trailer mounted system which includes a coarse filter unit and a plurality of hydrocyclone separators that may be moved from place to place in order to clean the water residing in cooling tower basins.

Large quantities of water are used for various cooling purposes in industry. This may be for cooling condensers in power plants, distilleries, oil refineries, or chemical plants; for cooling internal combustion engines in diesel power plants, gas engines in compression or pumping stations, or gasoline engines in automotive or aviation plants; for cooling furnace fronts in steel mills; for cooling tubes in radio broadcasting stations; for cooling compressors in refrigeration or liquid gas manufacturing plants; for cooling chemical and other products; for air conditioning; and for a variety of other cooling processes. The amounts of water required for cooling vary considerably depending on the temperatures of the cooling water and the particular use to which it is put. The source of the cooling water may be ground waters, surface waters, or seawater. Water from wells is greatly favored for once through cooling purposes on account of its even temperature, whereas surface waters are usually subject to large seasonal variations in temperature. At locations where seawater is available, the amounts obtainable are obviously dependent only on the size of the intakes, pipelines, and pumps. It is generally only used once through and then discharged to waste, however.

Cooling systems may become clogged with scale, corrosion deposits, sediment, and organic growths. The principal scale forming material in cooling systems is calcium carbonate formed by the decomposition of calcium bicarbonate into calcium carbonate, carbon dioxide, and water. The most common form of corrosion in ferrous metal vessels is dissolved oxygen corrosion caused by the oxygen content of dissolved air. Turbid waters containing either coarse sediment or fine suspensoids are objectionable in most cooling systems since they are troublesome and form clogging deposits. Iron and manganese bacteria known as "crenothrix" is troublesome in cooling waters as it forms luxuriant masses which slow flow rates and block passages.

The specifications for cooling waters vary widely with different classes of water for various industrial applications so that it can only be said that the water should not form heat insulating scales or other clogging deposits either inorganic or organic and that it should not be widely corrosive under the particular conditions of use or reuse. The general categories on the basis of use are once through and recirculation. As the name implies, in the case of once through, the cooling water is to be used once and then wasted. Therefore, any treatments required are cheap, and such methods are only practical where a more than plentiful supply of water is available. The most common system is one in which the cooling water circulates through the cooling system, is cooled through a cooling tower or spray pool, and is then recycled.

A cooling water is an enclosed device for the evaporative cooling of water by contact with air. This is achieved by an exchange of latent heat resulting from the evaporation of some of the circulating water and partly by a transfer of sensible heat. Such devices can be classified as ponds, atmospheric, chimney tower, and mechanical draught devices. A cooling pond is the most simple and cheapest method of cooling water. It consists of a large pond in which cooling takes place by air contact at the surface; and cold water is drawn from one end of the pond, and the hot water returned to the other. An atmospheric tower is a tower in which the air movement through the tower is dependent only on atmospheric conditions. Winds blow horizontally and the water falls by gravity vertically, and therefore the flow of air is crosswise to the flow of water. A chimney tower is a tower through which air is induced by a large chimney stack above the packing. Mechanical towers, on the other hand, are those towers that utilize fans to move the air through the tower. Such fans can be located in the air intake or the air outlet. In any event, all of the above types of devices include a basin of some sort which is that portion beneath the cooling section that is used for collecting and retaining the cold water produced. Cooling waters may be treated by the cold lime process, sodium calcium exchange, two stage cold lime and sodium calcium exchange, demineralization, the acid process, and chlorination. The removal of turbidity may be accomplished by filtration.

It has been the practice in the past to clarify cooling tower basin waters by means of permanent installations built adjacent the cooling system. For example, it has been common to construct a clarification section adjacent the cooling tower, which section may include large and expensive clarification devices as sand bed filters, pressure type filters, gravity filters, backwash filters, activated carbon filters, zeolite filters, and neutralizing filters. While such permanent installations have met with success in the clarification of cooling tower basin waters, they nevertheless suffer from the disadvantage that their construction is expensive and they are not versatile nor flexible due to the permanent type of installation involved. Thus, the initial capital outlay involved in such systems is enormous, and they cannot be moved easily from place to place in order to serve more than a single installation.

The disadvantages of the prior art are overcome with the present invention and commerically acceptable embodiments of a cleaner for cooling tower basin water and the like are herein provided which are not only fully capable of removing solids and sediments from the water of a cooling tower basin but which are also fully capable of other tasks completely beyond the capabilities of the devices of the prior art. More particularly, however, the embodiments of the present invention are portable and are capable of operating with a much higher efficiency and at a substantially reduced cost of construction.

SUMMARY OF THE INVENTION

This invention is for an improved device for separating solids from liquids and more particularly relates to a portable cleaning apparatus for removing solids and particulate material from water in the basin of a cooling tower and wherein there is provided a trailer with a frame for supporting a platform and a plurality of wheels for enabling said trailer to be towed from place to place, a power driven pump means mounted on said platform and having a suction side adapted to be placed into communication with water contaminated with solids in the basin of a cooling tower, a filter device arranged on said platform and including a filter medium therein, an inlet for liquid influent connected to the pump outlet and an effluent outlet downstream of the filter medium, the filter medium being so constructed and arranged so as to retain solid particles thereon whose diameter is in excess of 0.375 inches, a bank of a plurality of hydrocyclone separators located on said platform and including a feed header in communication with the feed inlet of each hydrocyclone, an outlet header being connected to the overflow discharge of each hydrocyclone, said filter effluent outlet being connected to said feed header, and said outlet header recirculating clarified effluent back to the basin of said cooling tower, a sediment solids tank arranged on said platform and with said filter device having a solids discharge outlet in communication with said tank, each of said hydrocyclones including underflow discharge means in communication with said tank, and auger means having an inlet located within said tank and an outlet adapted to discharge solids outside said tank to remove sludge and sediment from said tank.

In one particularly ideal embodiment of the present invention, an expanded metal filter medium is used in the filter device to remove larger solids from the cooling tower water in the basin. Solids collected by said filter device and those discharged as underflow from the hydrocyclone bank are commingled in a sediment tank where they are removed by an auger. The auger may be permanently attached to a swivel post arrangement to be lowered into use as need be, or the auger may be capable of being disassembled when not in use and stored in a pipe or hose rack carried by the trailer framework.

In another particularly ideal embodiment of the present invention, the filter device is located above the sludge tank to facilitate discharge of solids from the filter to the tank. There is provided in the bottom of filter device a dump valve that enables both chambers in the filter device to be cleansed of solids. The chamber on the side of the filter medium in communication with the inlet occupies two-thirds of the total volume of the filter device, whereas the chamber on the side of the filter medium in communication with the outlet occupies the other one-third of the total volume of the filter device.

In a further particularly ideal embodiment of the present invention, an air cooled diesel engine powers the pump of the present invention, and the pump is selected of a capacity to generate 400-1000 gallons per minute at a head of 75 feet. The pump is preferably an automatic vacuum priming solids handling centrifugal pump driven, for example by a Lister HR-2 air cooled and diesel engine. Pump suction and discharges of from four to six inches have been found to be most preferable in the herein described embodiments of the present invention.

Accordingly, it is a feature and object of the present invention to provide a device capable of treating cooling tower basin water in order to reduce the build-up of solids and sediments therein and to thereby increase the efficiency of the cooling tower.

It is another feature and object of the present invention to provide a portable cooling tower basin water cleaner capable of being moved from place to place with ease and which can be connected into the tower system to recirculate the chemically treated water free of solids and to thereby eliminate the necessity for discharging otherwise valuable chemically treated cooling tower liquid.

It is a further feature and object of the present invention to provide a solids removal device for cooling tower basin sediment contaminated water which device is operative to remove solids and to recirculate effluent back to the basin during operation of the cooling tower and thus avoiding the costly necessities of down time due to shut down of the tower or the equipment utilizing water from the tower.

It is yet another feature and object of the present invention to provide an apparatus for reducing the volume of the contaminant in the cooling tower basin water, thus requiring a smaller volume of contaminated water to be dumped under the EPA surveillance.

These and other features, objects, and advantages of the present invention will become apparent from the following detailed description wherein reference is made to the various figures in the accompanying drawings.

IN THE DRAWINGS

FIG. 7 is a pictorial representation of another embodiment of a trailer assembly including the various components of the separating system of the present invention; and FIG. 8 is a pictorial representation of a portion of the apparatus of FIG. 7 and more particularly directed to the filter pump valve and sediment tank.

DETAILED DESCRIPTION

Figure 1:
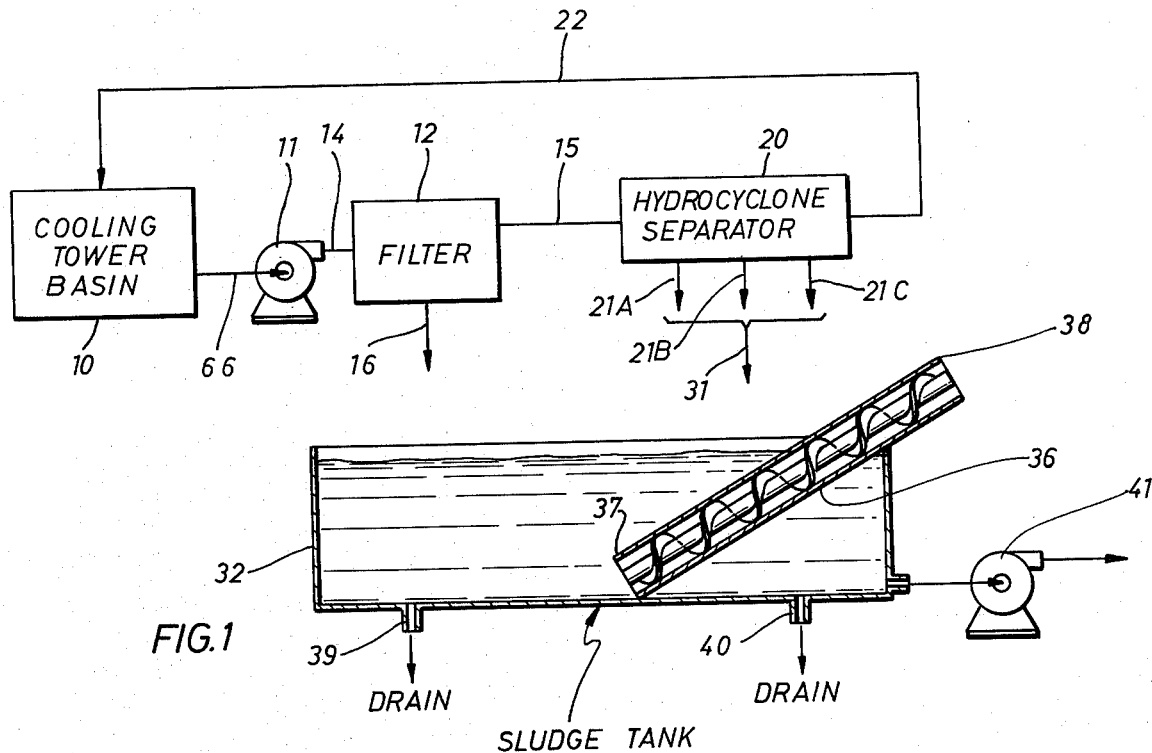
FIG. 1 is a functional representation showing sequentially the various steps carried out by the apparatus of the present invention.

In FIG. 1, there will be seen an overall view of the system of the present invention and shown functionally in order to facilitate an understanding of the present invention. More particularly, there will be seen a basin 10 of a cooling tower and wherein there is collected the otherwise cooled water along with solid particulate material carried thereby. It has been found that this basin 10 will also contain in addition to the finer sediments such as dirt, dust, mud, and sand, other larger solid objects such as bolts, nuts, stones, rocks, tools, such as wrenches, and fallen animals such as dead pigeons. Any build-up of the solids to any substantial degree cuts down on the efficiency of the cooling tower, and therefore a pump 11 is provided to withdraw materials in basin 10 and to pump these materials such as water and solids to treatment apparatus where such unwanted solids are to be removed and the clarified effluent recycled to the basin 10.

Pump 11 is an automatic vacuum priming solids handling centrifugal pump and is close coupled to either a Lister HR-2 or ST-2 air cooled diesel engine. With four inch suction and discharge lines, the pump can handle solids having a maximum diameter of 2.5 inches. It is preferred to operate pump 11 at 400 gallons per minute and 75 feet of head. A larger type of pump can also be used if desired such as the one above described but being driven by a Lister HR-3 air cooled diesel engine and having six inch suction and discharge lines. In this case, the pump will handle solids up to 3.0 inches in diameter and is operated to move 1000 gallons per minute at 75 feet of head. Obviously, other pumping systems having other specifications from those above described will occur to those skilled in the art and may be employed herein as equivalents although the hereinbefore set forth details are the preferred forms of the present invention.

Figure 3:
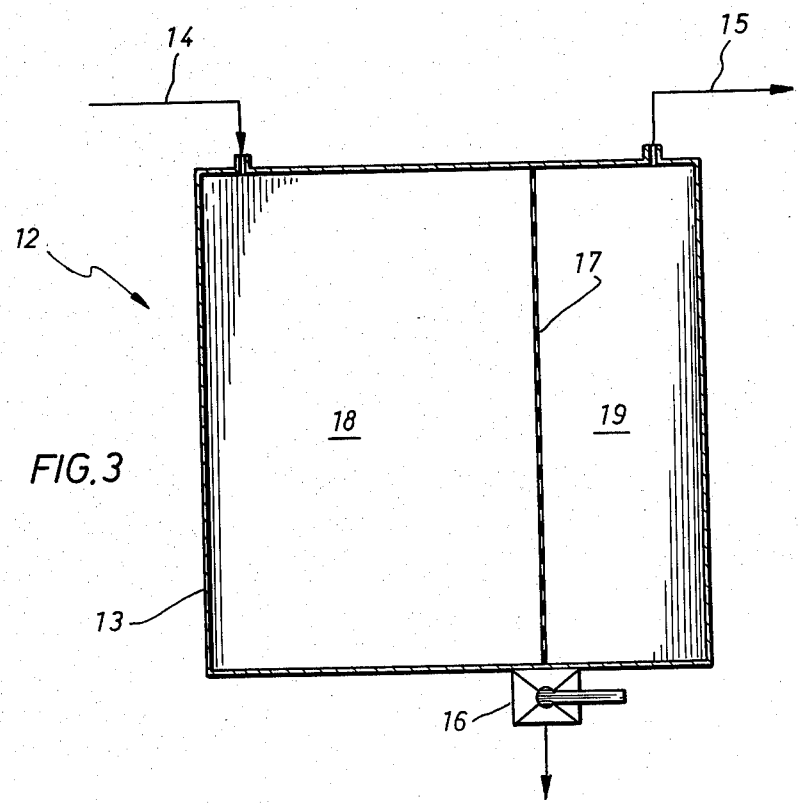
FIG. 3 is a pictorial representation partly in cross-section of the filter device employed in the apparatus of the present invention.

In any event, pump 11 forces material from basin 10 and into filter device 12 which as seen in FIG. 3 includes a large tank 13 having a feed inlet 14 from pump 11 and a clarified effluent outlet 15 for delivering liquid containing fine solids to a further clarification unit. A discharge valve 16 is located in the bottom of filter tank 13 and is provided to remove solids from the interior of tank 13. A filter medium 17 extends across the tank 13 between the inlet 14 and the outlet 15 and functions to trap large solids at the side of the tank adjacent inlet 14. The preferred filter medium 17 is 0.50 inch expanded metal, which medium in practice will remove solids larger than 0.375 inches in diameter while allowing particles smaller than 0.375 inches in diameter to pass through the screen 17 and on through outlet 15. It should be noted that while expanded metal is specified herein, other and equivalent filter mediums such as standard wire mesh screens may be employed, however. A heavy duty expanded metal screen has been found to be most satisfactory since it is stronger than equivalent wire mesh screens and is able to better withstand the forces exerted upon it by objects impinging against the filter medium.

The expanded metal filter screen medium 17 is placed within tank 13 so as to provide an influent chamber 18 and an effluent chamber 19, with chamber 18 being twice the size of chamber 19. In other words, chamber 18 occupies twice the volume of chamber 19, and for that reason, a substantial amount of solid objects will accumulate in chamber 18 due to the screening action of filter 17, and the larger chamber 18 provides room for such solid objects as they build up. Valve 16 is so positioned to communicate with both chambers 18 and 19, and therefore the filter 12 can be cleaned out of solids by opening valve 16 which will flush solids out of each of chambers 18 and 19. A twelve inch gate valve is preferred for valve member 16.

Effluent from filter 12 containing smaller particulate contaminants is passed via feed line 15 as shown in FIG. 1 to a bank 20 of a plurality of hydrocyclone separators which is arranged in parallel. Undersized solids are removed from the hydrocyclone bank at 21A-21C, and the clarified effluent is recycled to basin 10 via feed line 22.

The basic unit of a centrifugal separator is the cone assembly in which solids are separated from suspension in a fluid or slurry by centrifugal force, which results from rotation of fluid in the cone without requirement for any moving parts. Fluid is directed into the cone through a tangential inlet which imparts rotary movement, generating the centrifugal force. This force separates the fluid into conical layers, the heaviest of which move along the cone wall and drop by gravity to an underflow outlet. Clarified fluids, free of solids, float inward to a vortex at the cone center and escape through an overflow outlet. Inlet and overflow passages are of fixed size for a given cone, but underflow controls may be adjusted to alter the separating action.

The high centrifugal separation forces in a hydrocyclone are created by the feed stream entering tangentially at a constant head pressure as from a centrifugal feed pump. A balanced design hydrocyclone can be adjusted so clean liquid will spiral toward the apex, reverse axial directions, and spiral to the overflow with no loss of liquid at the underflow.

If solids are present, they will be settled to the outside wall in the down spiraling stream and will discharge at the underflow by inertia when the liquid stream changes direction. The removed solids take with them free liquid on their surfaces. If the underflow opening is large enough to handle all the feed solids separating to the underflow, a balanced cyclone will operate in "spray discharge". If the feed solids separating to the underflow cannot pass through the underflow opening, the solids discharge will "rope" or "sausage discharge", indicating solids overload.

Figure 2:
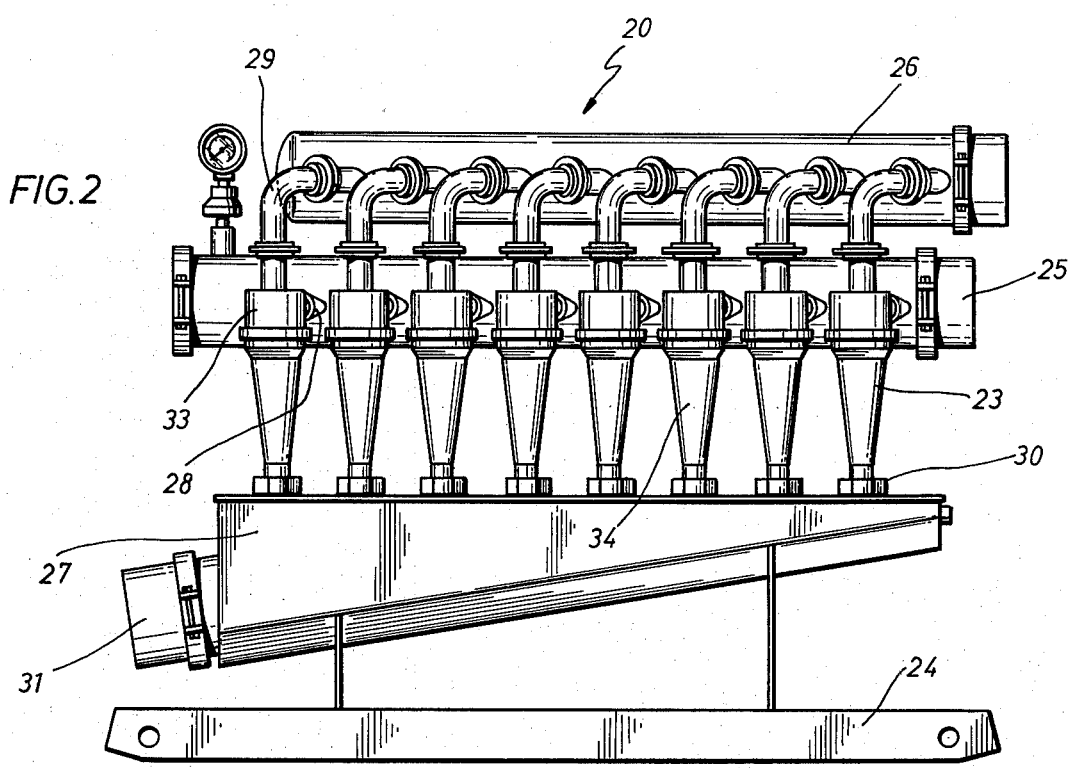
FIG. 2 is a pictorial representation of a bank of a plurality of hydrocyclone separators used in the apparatus and system of the present invention.
Figure 4:
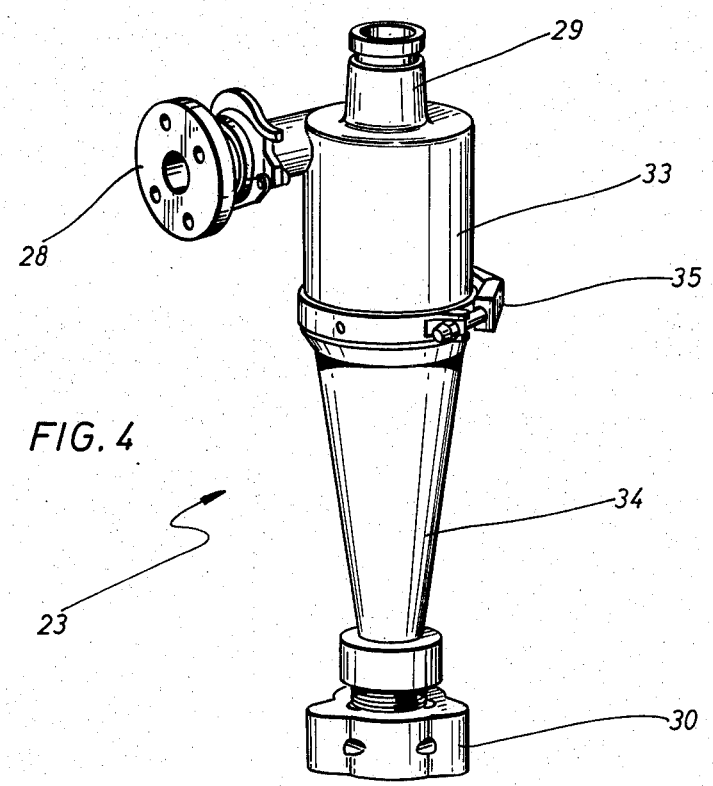
FIG. 4 is a pictorial representation of a single hydrocyclone separator of the banks of FIG. 1 and setting forth more or less the details of construction of the separator unit.

In any event, the hydrocyclone bank 20 is set forth in more detail in FIG. 2 with the specific construction of the single hydrocyclone of the bank illustrated in FIG. 4. However, in FIG. 2 there will be seen a plurality of individual hydrocyclones 23 mounted on a skid 24 and including a feed header 25, a clarified effluent outlet header 26, and a solids discharge chute 27. The feed inlet 28 of each hydrocyclone is connected to the feed header 25 so that all of the hydrocyclone units 23 operate in parallel. The overflow outlet 29 of each hydrocyclone is connected to outlet header 26 in order to recycle the clarified liquid back to basin 10 via recirculation line 22. Each hydrocyclone includes an underflow discharge 30 for solids, and these charge openings 30 each are directed into though 27 for collecting all of the discharged solids having a diameter less than 0.375 inches and directing them out pipe 31 to be dumped in tank 32 along with the solids 16 from filter unit 12.

Each hydrocyclone 23 can be seen more particularly in FIG. 4 and will be seen to comprise an inlet 28 which is tangentially oriented with respect to feed chamber 33. Feed chamber 33 includes a tubular vortex finder (not shown) which communicates with overflow outlet 29 to discharge clarified fluid from cone 34. It is preferred to construct the upper section of the hydrocyclone 23 including inlet 28, outlet 29, and chamber 33, of polyurethane, whereas cone 34 and discharge 30 are of aluminum. Cone 34, if desired, may contain a liner of urethane, polyurethane, hycar rubber, Buna-N, or nitride rubber, for abrasion resistance. The top section 33 is secured to the cone 34 by a quick release stainless steel snap coupling 35 which provides that a new lines can be placed in cone 34 simply by the hand release of coupling 35. A typical assembly as seen in FIG. 2 will have a length ranging from 62–117 inches, a width from 30–40 inches, a height from 52–66 inches, a weight of from 651–2875 pounds, headers from 4–8 inches in outside diameter, and feed rates at 75 feet of head of 200–1200 gallons per minute. What is preferred in the present invention, however, is a model No. T8-4 sold under the trademark "The Economaster" by Piceno International, Inc., and wherein the unit as seen in FIG. 2 has the following specifications:
Model No.: T8-4
Length: 62 inches
Width: 40 inches
Height: 53 inches
Feed Rate: 400 GPM
Weight: 1175 pounds
Header O.D.: 6⅜ inches
L/m: 1514

With reference again to FIG. 1, it will be seen that solids are dumped via lines 16 and 31 into sludge tank 32 which tank 32 includes therein an auger 36 having a feed end 37 and a discharge end 38, which auger 36 is used to convey solids from tank 32 to a dump truck (not shown) for disposal. Drains 39 and 40 may be provided in the bottom of tank 32 to flush and clean tank 32 on occasion. In those instances where a liquid slurry is collected in tank 32, a pump 41 may be used to discharge material from tank 32. Auger 36 is preferably a standard grain auger of six inch diameter and is driven by a diesel engine.

Figure 5:
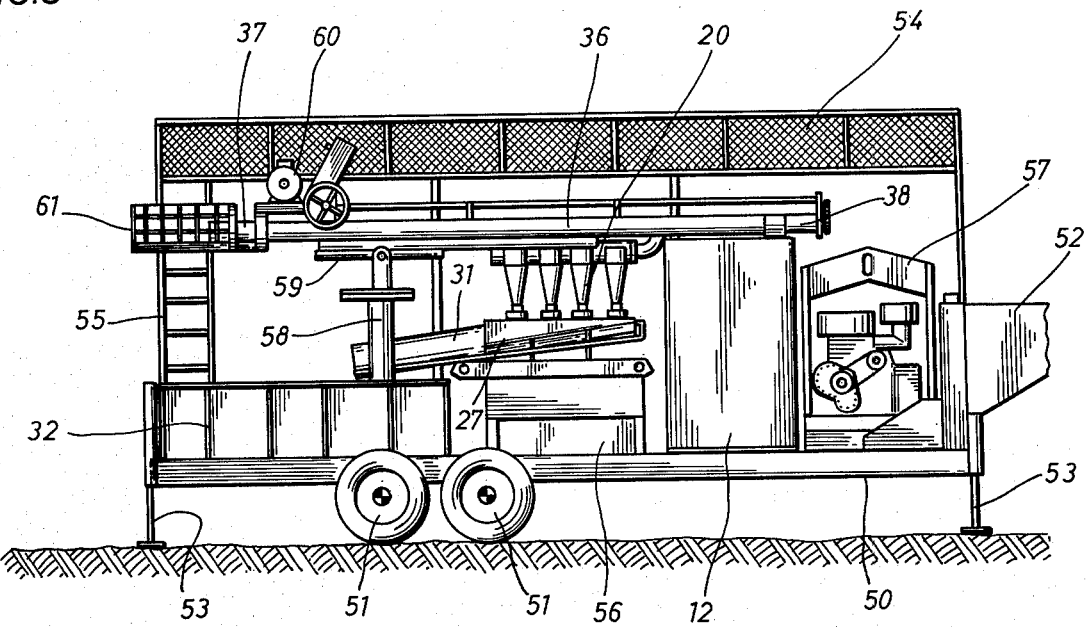
FIG. 5 is a pictorial representation of one embodiment of a trailer assembly including the separating system of the present invention.

With reference now to FIG. 5, an embodiment of the present invention is set forth wherein all of the component generally seen in FIGS. 1–4 are mounted together as a portable unit able to be towed from place to place. More specifically, there is seen in FIG. 5 a trailer having a frame 50 supported by wheels 51 and carrying tank 32 at the rear end. A gooseneck connection 52 is provided at the forward end of the frame 50 for attachment to a truck, for example. A plurality of outriggers 53 is attached to frame 50 so that the trailer can be jacked up when in use in order to remove the weight from the wheels 51. A pipe rack 54 extends across the top of the trailer and is used to store hose and pipe required during use of the apparatus. A ladder 55 provides access to the rack 54 for storing and removing sections of pipe or hose therefrom.

Referring again to FIG. 5, filter 12 can be seen disposed toward the front end of the trailer and sandwiched between a tool box 56 and diesel engine 57 which drives pump 11. A revolvable and tiltable stand 58 extends upwardly from tank 32 and includes a bracket 59 to which is attached the auger 36. The auger 36 in FIG. 5 is shown in its stored position, it is to be noted, but when in use, is swung about stand 58 and tilted by bracket 59 to place its feed end 37 into tank 32 for the purpose of withdrawing the solid slurry therein. In FIG. 5, the electric motor 60 for powering the auger 36 is seen, as well as the guard 61 for protecting the feed end of the auger.

Figure 6:
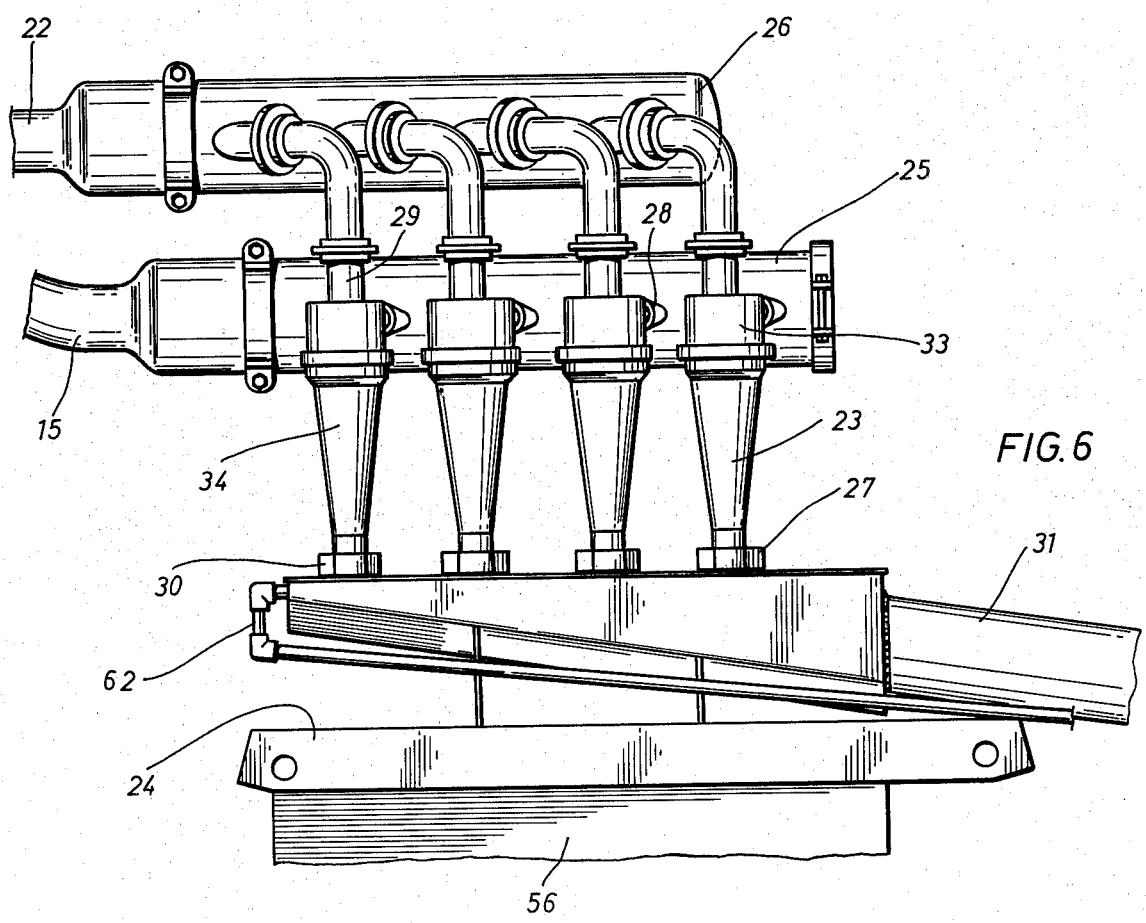
FIG. 6 is a pictorial representation of a portion of the trailer assembly of FIG. 5 including the hydrocyclone bank.

The bank of hydrocyclone separators 20 seen in FIG. 5 is illustrated in more detail in FIG. 6 wherein there can be seen feed line 15 being connected to header 25. Outlet header 26 returns effluent to the basin 10 of the cooling tower, and solids trough 27 collects the underflow discharge from each hydrocyclone separator 23 whereby pipe 31 dumps these collected solids into tank 32. In the event that trough 27 becomes clogged at the outlet 31, an overflow line 62 is attached to trough 27 and returns materials in trough 27 to tank 32. It should be noted in FIG. 6 that four cyclones 23 are seen on one side of header 25 and four are arranged on the opposite side of header 25 for a total of eight separators 23, all connected in parallel. While eight hydrocyclone separators are preferred, there could be employed any number of parallel units as desired numbering from four to twenty-four, for example.

With reference now to FIGS. 7 and 8, another embodiment of the invention will be seen practically identical to that previously described with respect to FIG. 5. In the variation of FIGS. 7 and 8, however, the filter device 12 is located to discharge solids via valve 16 directly into tank 32, and therefore legs 63 are provided for the filter 12 to raise it above tank 32 to provide for the discharge of valve 16 into tank 32 whenever valve 16 is opened by handwheel 64. In FIG. 8, auger 36 can be seen in its operative position on stand 67 with the feed end covered by guard 61 and adjacent the wall 65 of tank 32. Otherwise, operation of the systems of FIGS. 5, 7, and 8 is the same.

In operation, a flexible hose 66 from pump 11 is extended into basin 10 after trailer 50 has pulled alongside. The trailer 50 is jacked up and rested on outriggers 53 in order to relieve the weight of the trailer from the wells 51. With hose 66 in place, engine 57 is started to drive pump 11, and materials are drawn from basin 10 into filter 12. Solids larger than 0.375 inches in diameter are retained by screen 17 and periodically flushed by valve 16 into sludge tank 32 for disposal by auger 36. Effluent from filter 12 is passed by line 15 to header 25 of cyclone bank 20 where a finer separation is effected and practically solid free liquid is recycled to basin 10 by line 22 via outlet header 26. Unwanted solids are discharged by each underflow outlet 30 of each separator 23 into trough 27 and fed into pipe 31 for discharge to tank 32. Tank 32 is periodically cleaned of sludge by use of auger 36 and at the end of a cycle may be cleaned using drains 39 and 40 and pump 41. After basin 10 by been satisfactorily cleaned, engine 57 is stopped and hose 66 removed from basin 10 and stored in rack 54. Trailer 50 is then again lowered onto wheels 51 and is ready to be towed to the next basin for another cleaning operation as generally above described.

Numerous advantages are possessed by apparatus of the above described invention. For example, in a typical five cell cooling tower, the water basin may be from 150 feet in length, 60 feet in width, and from three to twelve feet in depth. A substantial amount of money is required to chemically treat that water, and therefore with the portable device of the present invention, the water can be clarified and recycled to the basin, thus saving the cost of discarding the spent basin water and adding fresh water with the added expense of chemically retreating the water again. Thus, with the device of the present invention, spent cooling tower basin water may be clarified and recycled as fresh basin liquid and including the treatment chemicals. The disclosed device also saves down time on plant apparatus since the basin water can be clarified in the device as the cooling tower is operating, and it is not required that the cooling tower be shut down nor the plant apparatus utilizing the water therefrom. Thus, water in the basin can be passed through the apparatus of the present invention while the plant apparatus and the cooling tower still continue to run and operate. Also spent cooling tower basin water previously forced to be hauled and dumped into an EPA approved site can be regenerated in the device of the present invention and recycled again to the basin for reuse without the expense on a per gallon basis exacted under dump site regulations.

Even though the description herein has been given with respect to clarification of cooling tower basin supplies, it is to be understood that the device has general utility in the field of solid liquid separation and clarification. It is particularly useful, for example, in the chemical industry for removing solids from settling basins as coke tailings from the water in tanks and ponds. The device is useful also in a steel mill for removing steel dust from water in lift stations, settling tanks, and cooling towers. In a specific and particular application, for example, solid sulfur has been separated from a STRETFORD salt solution using the device of the present invention.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

What is claimed is:

1. A portable cleaning apparatus for removing solids and particulate material from water in the basin of a cooling tower and comprising:
    a trailer having a frame supporting a platform and a plurality of wheels for enabling said trailer to be towed from place to place;
    a power driven pump mounted on said platform and having an outlet and a suction side adapted to be placed into communication with solids in the basin of a cooling tower:
    a filter device arranged on said platform and including a filter tank having a filter medium disposed therein to divide said filter tank into an influent chamber and an effluent chamber, an inlet for liquid influent connected to the pump outlet connected to said tank to deposit liquid influent into said influent chamber, and an effluent outlet connected to said effluent chamber, the filter medium being so constructed and arranged so as to retain solid particles thereon whose diameter is in excess of 0.375 inches, said filter device including a solids discharge outlet connected to the bottom of said filter device and adapted to dump accumulated solids into said tank, said solids discharge outlet being in communication with both said influent and effluent chambers whereby solids collected on either side of said filter medium can be discharged through said solids discharge outlet and into said solids sediment tank;
    a bank of a plurality of hydrocyclone separators located on said platform, each of said hydrocyclones having a feed inlet and an overflow discharge, and including a feed header in communication with the feed inlet of each hydrocyclone, an outlet header being connected to the overflow discharge of each hydrocyclone, said filter effluent outlet being connected to said feed header, and said outlet header recirculating clarified effluent back to the basin of said cooling tower, each of said hydrocyclones including an underflow discharge means;
    a sediment solids tank arranged on said platform with said filter device solids discharge outlet and each of said hydrocyclone underflow discharge means in communication with said sediment solids tank; and
    auger means having an inlet located within said sediment solids tank and an outlet adapted to discharge solids outside said sediment solids tank.

2. The cleaning apparatus of claim 1 wherein said filter medium is a sheet of heavy duty expanded metal.

3. The cleaning apparatus of claim 1 including swivel post means mounted in said sediment solids tank and with said auger means being connected to said post means, said post means being adapted to allow said auger means inlet to be brought into and out of communication with the solids in said sediment solids tank.

4. The apparatus of claim 1 wherein there is provided a discharge chute in communication with each underflow discharge means of said hydrocyclones and wherein said chute has a separate outlet means connected to dump solids into said sediment solids tank.

5. The apparatus of claim 4 wherein a liquid overflow outlet means is connected at one end to the upper portion of said chute and the other end of said overflow directs liquid into said sediment solids tank.

6. The apparatus of claim 1 wherein said filter device solids discharge outlet includes an access door to enable solids dropped by said filter medium to be removed from said filter.

7. The apparatus of claim 1 wherein said filter device is located and supported above said tank, said filter device solids discharge outlet includes a valve means.

8. The apparatus of claim 7 including a hose rack attached to said frame and being adapted to support items above the filter and hydrocyclones, said auger means being adapted to be disconnected and stored when not in use in said rack.

9. The apparatus of claim 8 wherein said pump means is powered by an air cooled diesel engine and has a capacity of from 400–1000 gallons per minute at 75 feet of head.

10. The apparatus of claim 9 wherein said trailer includes a gooseneck connection for attachment to a prime mover capable of pulling said trailer, and wherein said frame includes a plurality of outrigger members whereby said trailer can be jacked up when in use in order to relieve the wheels of the weight supported by the frame.

11. The apparatus of claim 10 wherein there is mounted on said platform between said filter device and said solids sediment tank a storage container means for holding tools, supplies, and spare parts or accessories.

12. The apparatus of claim 1 wherein said filter medium is arranged in said filter device such that said influent chamber occupies two-thirds of the volume of said filter tank and said effluent chamber occupies one-third of the volume of said filter tank.

* * * * *